W. R. STURGEON.
SHOCK ABSORBER.
APPLICATION FILED SEPT. 6, 1911.
1,029,478.
Patented June 11, 1912.
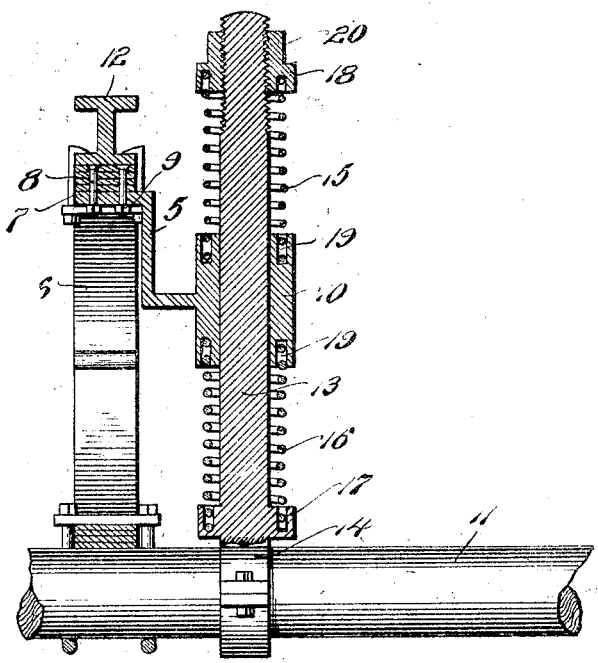
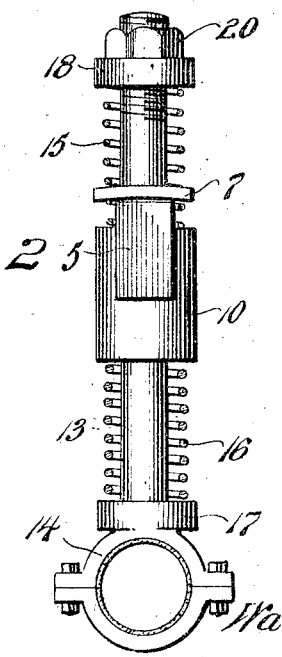
Inventor
Walter R. Sturgeon
Witnesses
By Victor J. Evans
Attorney

UNITED STATES PATENT OFFICE.

WALTER R. STURGEON, OF STERLING, KANSAS.

SHOCK-ABSORBER.

1,029,478.  Specification of Letters Patent.  Patented June 11, 1912.

Application filed September 6, 1911. Serial No. 647,827.

*To all whom it may concern:*

Be it known that I, WALTER R. STURGEON, a citizen of the United States, residing at Sterling, in the county of Rice and State of Kansas, have invented new and useful Improvements in Shock-Absorbers, of which the following is a specification.

The general object of the invention is to improve the running qualities of an automobile or other vehicle, and to this end the invention resides in a shock absorber including a plurality of springs adapted to compress successively on the compression and expansion of the vehicle springs.

Other objects will appear and be better understood from the following description taken in connection with the accompanying drawings, in which, Figure 1 is a vertical section of a sufficient portion of a vehicle to show the application of one embodiment of my invention. Fig. 2 is a detail side elevation partly in section of the device and looking at right angles to Fig. 1.

For purposes of illustration I have shown the device connected to the spring and axle of a vehicle. This particular application, however, need not be adhered to in so far as connecting the device to the spring is concerned, since the same result, namely that of absorbing or cushioning the shock, may be produced by connecting the device to the axle and body of the vehicle. In addition it may be stated that any number of devices may be employed as found necessary and while preference is given to four, two of which are arranged on each axle and in juxtaposition to the springs or body according to the construction of the vehicle, still the number may be increased and the devices arranged at other portions found suitable for connecting the axle to the springs or to the body.

In the embodiment shown, 5 indicates an angular-shaped bracket which is adapted for connection, in the present instance, to the spring 6. Any preferred construction may be employed for effecting this connection such as by providing an enlarged flattened portion 7 on the bracket and piercing the said portion 7 and the springs so as to receive suitable fastening devices such as bolts 8 which are secured by nuts 9.

10 indicates a vertical guide which is formed with or otherwise secured to the horizontal portion of the bracket 5 so as to overlie the axle 11 and extend parallel with the vertical plane of the spring 5 or the body 12.

13 indicates the rod which slides in the guide 10 and 14 a clamp at the lower end of the rod and adapted for connection to the axle 11.

15 and 16 indicate compression springs which encircle opposite end portions of the rod, their remote ends being received by cups 17 and 18 at the opposite ends of the rod and their adjacent ends being harbored in counter-bores 19 in opposite ends of the guide 10. Since the ends of the springs are harbored by the cups and counter-bores the springs, when not under compression, will be prevented from vibrating and producing noises as the wheels pass over the ground. The upper spring 15 is the weaker of the two so as not to abruptly check rebound but to gradually overcome the same. The cup 18 is adapted to be screwed onto the upper end of the rod 13 and has a non-cylindrical boss 20 providing wrench faces, whereby, the cup may be readily turned either onto or off the rod.

When the wheels of the vehicle to which the invention is applied pass over rough places in the road, the ensuing vibration will be first imparted to the spring 16 and then to the spring 15 which will be compressed on rebound, much if not all the vibration will be absorbed by these springs and thereby prevented from being communicated to the body of the vehicle through the main springs 6. When the vehicle passes over ruts in the road the relatively strong lower springs 16 will be first compressed as the main springs are compressed. Upon rebound, however, and when the main springs expand, such expansion of the said main springs will be gradually checked by the spring 15 which will then be compressed. This compression of the springs 15 and 16 will have the effect of cushioning the jolts incident to the wheels moving through ruts.

Although I have shown and described one embodiment of my invention it is to be understood that I am not to be limited to the specific construction and arrangement of parts since various changes will be made, within the scope of the appended claim without departing from the spirit or sacrificing any of the advantages of the invention.

What I claim as new is:

A shock absorber for vehicles comprising a bracket having a horizontal portion adapted for bearing on the lower face of the upper side of one of the vehicle springs, a downwardly directed vertical portion and a vertically disposed sleeve offset from and connected to the vertical portion, a rod slidingly fitted in the sleeve and having its lower end adapted to be clamped to the axle of the vehicle, a nut screwed onto the upper end of the rod, a cup adjacent to the lower end of the rod, and compression springs surrounding the rod and bearing on the opposite ends of the sleeve and also on the nut and cup.

In testimony whereof I affix my signature in presence of two witnesses.

WALTER R. STURGEON.

Witnesses:
W. H. BURNHAM,
T. F. STURGEON.